United States Patent [19]
Osten et al.

[11] 3,952,838
[45] Apr. 27, 1976

[54] TRANSMISSION PARK-LOCK MECHANISM

[75] Inventors: John H. Osten, Caledonia; Peter D. Ruffalo; Donald L. Johnson, both of Kenosha, all of Wis.

[73] Assignee: J. I. Case Company, Racine, Wis.

[22] Filed: Mar. 17, 1975

[21] Appl. No.: 559,125

[52] U.S. Cl. .................................. 188/31; 74/470; 192/4 A; 192/67 R
[51] Int. Cl.² ........................................... B60T 1/06
[58] Field of Search ............ 188/31, 60, 69; 74/470; 192/4 A, 67 R, 71

[56] References Cited
UNITED STATES PATENTS

| | | |
|---|---|---|
| 2,100,970 | 11/1937 | MacMullen ............................ 188/31 |
| 2,860,731 | 11/1958 | Hause ..................................... 188/69 |
| 3,078,964 | 2/1963 | Wildhaber ........................ 188/31 X |
| 3,386,532 | 6/1968 | Moss ................................ 192/4 A X |
| 3,703,941 | 11/1972 | Ohie et al. ........................ 192/4 A X |
| 3,709,344 | 1/1973 | Sieren ............................... 192/4 A X |

*Primary Examiner*—George E. A. Halvosa
*Attorney, Agent, or Firm*—Arthur J. Hansmann

[57] ABSTRACT

A transmission park-lock mechanism having a transmission shaft and a toothed gear thereon. A latch is mounted on a shaft adjacent the gear and engages the gear teeth for restraining the gear and the transmission shaft from rotating. There is a shaft and a lever and a torsion spring, all for positioning the latch into and out of engagement with the gear teeth.

6 Claims, 4 Drawing Figures

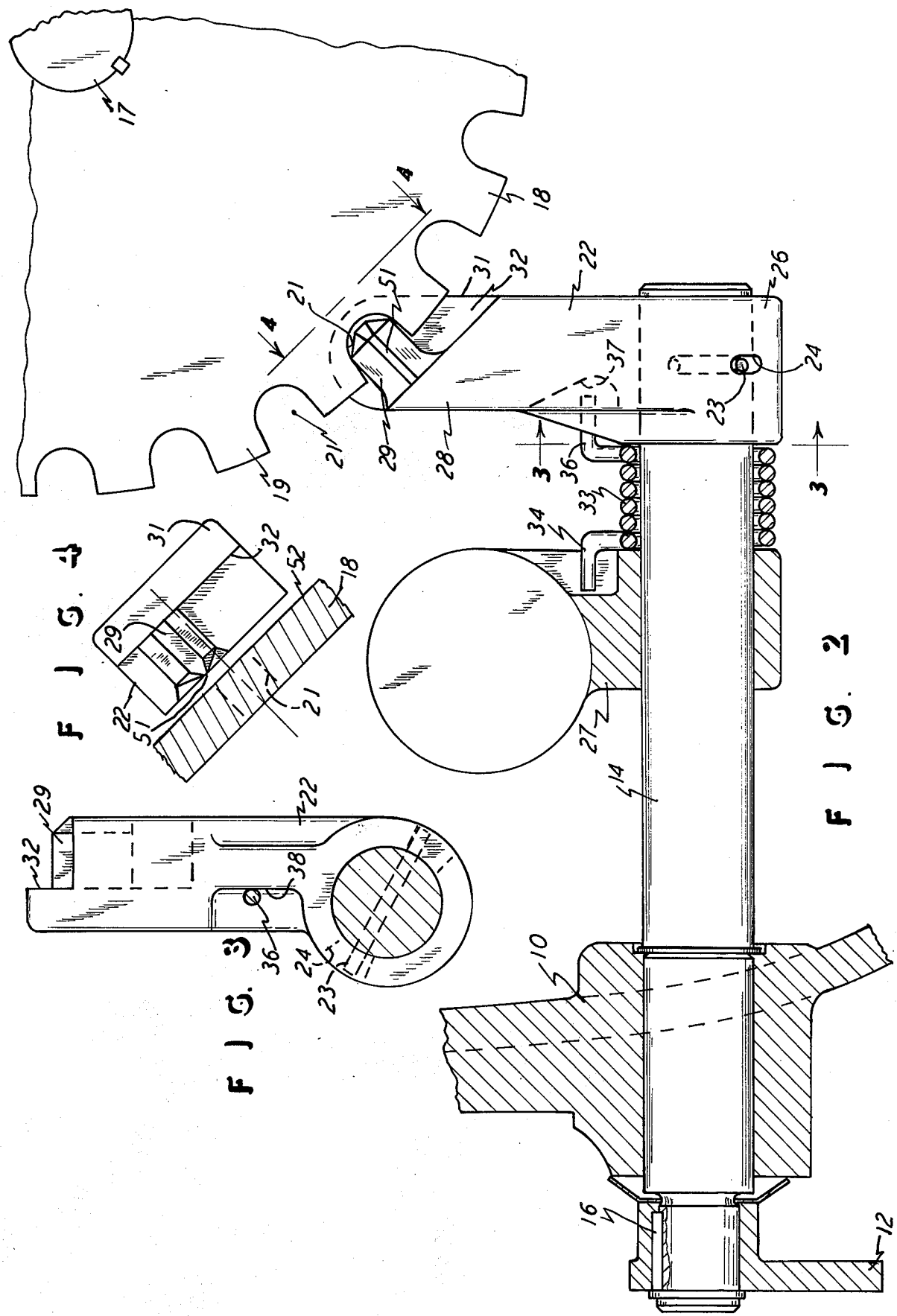

TRANSMISSION PARK-LOCK MECHANISM

This invention relates to a transmission park-lock mechanism of the type used in vehicles which have the transmission shift lever connected to a park-lock mechanism for restraining the transmission against rotation.

BACKGROUND OF THE INVENTION

Park-lock mechanisms already exist in many different forms in the prior art. These mechanisms commonly include a toothed gear mounted on the transmission shaft, or a like shaft, and they include a latch or lever which can be manually positioned into and out of engagement with the toothed gear, all for the purpose of restraining rotation of the transmission members and thereby securing the vehicle in a non-mobile position so that it cannot move. These park-lock mechanisms are commonly employed in present-day automobiles, trucks, tractors and other vehicles. The operator simply positions the transmission shift lever to a park position, and the mechanism then locks and restrains the transmission against movement. Examples of some prior art locking mechanisms and arrangements are shown in U.S. Pat. Nos. 2,689,029 and 2,727,603 and 2,875,856 and 2,881,872 and 3,346,081. Generally speaking, the aforesaid prior art patents show arrangements and mechanisms for moving a latch or lever into and out of engagement with a toothed gear on a shaft, such as a transmission shaft, for restraining the movement of a vehicle.

However, the prior art arrangements are complicated and not fully-reliable and sturdy and they commonly require that the locking latch or lever be arranged so that it can immediately seat and lock with the toothed gear at the time that the operator is maneuvering the shift lever. Accordingly, it is a general object of this invention to improve upon the prior art mechanisms and arrangements, such that the present invention provides a sturdy, reliable, and automatically-engaging type of park-lock mechanism for vehicles.

That is, the present invention provides a park-lock mechanism wherein the operator can set the shift lever to a park position and the mechanism will automatically operate to move a lever or latch to a restraining position with a toothed gear at the initial moment that the vehicle attempts to move and the toothed gear rotates a very slight amount.

Still further, it is an object of this invention to provide a park-lock mechanism wherein the locking latch or lever is under the control of a single type of control member, including a lever, which thereby only requires that the locking latch or lever be maneuvered through a small angle but with the result that the locking latch or lever is placed in a secure position either away from the toothed gear or into securing and engaged position with the toothed gear, all under the control of a single control lever. In accomplishing this objective, the present invention does not require that there be one mechanism for moving the locking latch or lever into the securing position and that there be another mechanism or element for maneuvering the locking latch or lever out of the securing position and free of the gear tooth. Thus, the present invention provides a simplified but reliable and sturdy park-lock mechanism.

Other objects and advantages will become apparent upon reading the following description in light of the accompanying drawings.

BRIEF DESCRIPTION OF THE DRAWINGS

FIG. 2 is a sectional view taken along the line 2—2 of FIG. 1, and with parts added thereto.

FIG. 3 is a sectional view taken along the line 3—3 of FIG. 2.

FIG. 4 is a sectional view taken along the line 4—4 of FIG. 2.

DETAILED DESCRIPTION OF THE PREFERRED EMBODIMENT

Figure 1:
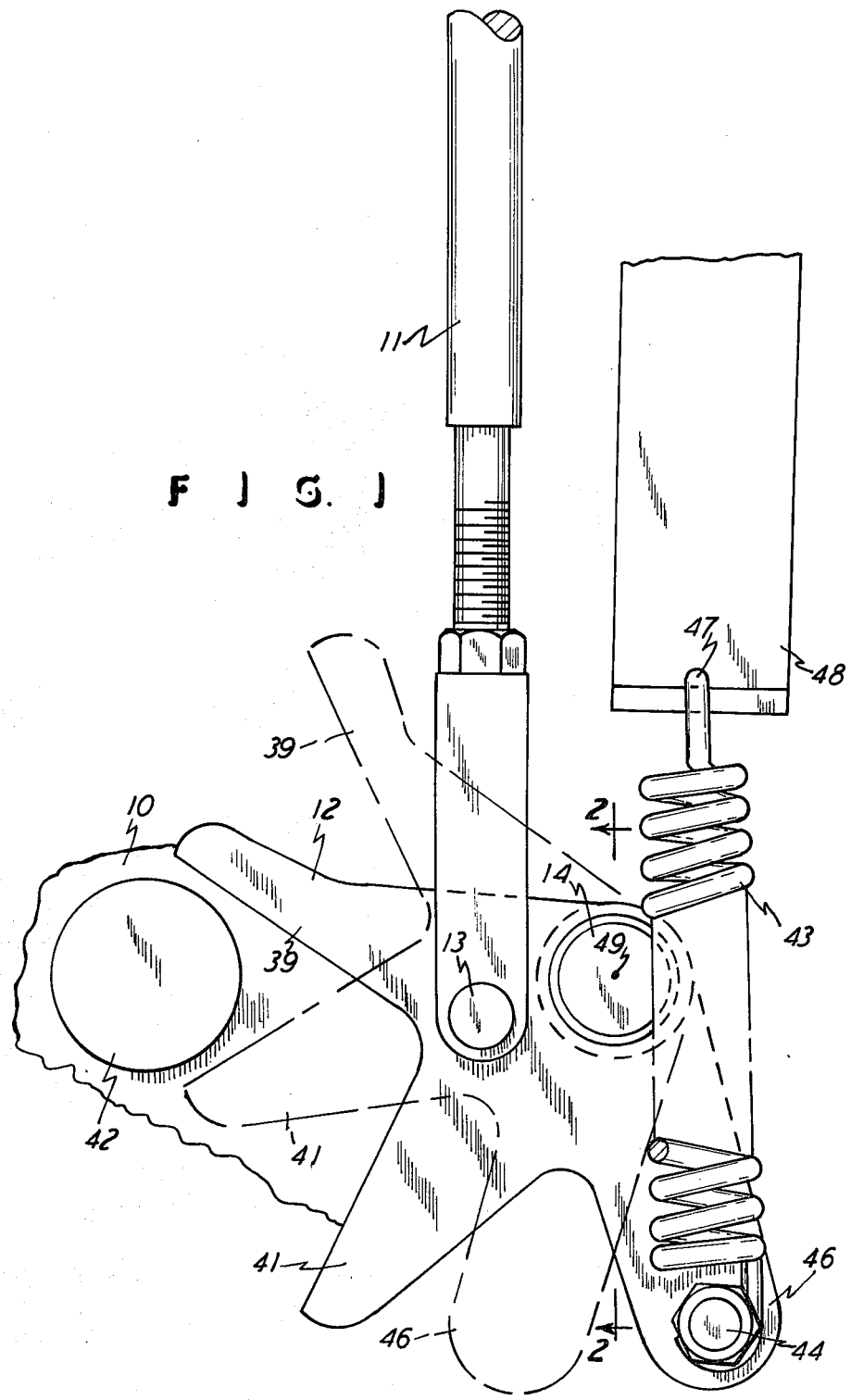
FIG. 1 is an end elevational view showing a fragment of the park-lock mechanism of this invention, and showing the mechanism in a second position, in dot-dash lines.

FIG. 1 shows at least some of the elements of the mechanism of this invention, and it will be here seen and understood that there is a vehicle transmission case 10 and a transmission shift or control rod 11 extends from the operator's control station (not shown) down to the transmission case 10 where it connects with a multi-arm lever 12 through a pin 13. The lever 12 is mounted on a shaft 14 which is rotatably supported by the transmission case 10, and the lever 12 and shaft 14 are keyed together, by means of a key 16 shown in FIG. 2, so that they rotate together. Thus, it will be understood, by one skilled in the art, that maneuvering of the control member or shift rod 11 causes pivotal action of the lever 12 which in turn rotates the shaft 14, for the action of the park-lock mechanism, as hereinafter explained. For further explanation, reference is made to U.S. Pat. Nos. 3,550,715 and 3,522,744, both of which show the arrangement of shift levers of a tractor-type of vehicle, and the shift levers connect to quadrants which in turn connect to the control or shift rods, such as the rod 11 of this invention, all for controlling the gears of the conventional transmission. Of course it will be understood that the operator can maneuver a control lever, which is not shown herein but which is shown in the two aforesaid patents, for maneuvering the unshown but usual quadrants to thereby maneuver the respective control rods, such as the rod 11, for setting and controlling the position of the elements in the transmission of the vehicle, all in a conventional arrangement.

The second sheet of drawings herein shows a fragment of a transmission shaft 17, and this may be the usual counter-shaft which is rotatably mounted in the transmission case 10, and a toothed gear 18 is shown keyed to the shaft 17 for rotating with the latter, and of course only a quarter of the total gear 18 is shown. The gear 18 has teeth 19 and tooth spacings or indentations 21, and these teeth and spacings are arranged throughout the entire circumference of the gear 18. A toothed latch or lever 22 is mounted adjacent the gear 18 and is supported on the shaft 14 and is connected thereto by means of a pin 23 which extends diametrically through the shaft 14 and is affixed to the shaft 14, and the pin extends into an elongated slot 24 in the hub 26 of the latch 22, all as shown in FIGS. 2 and 3. FIG. 2 also shows that the shaft 14 is rotatably supported on a portion 27 of the transmission casing 10. Therefore, the longitudinal axis of the shaft 14 is disposed at right angles to the vertical plane which extends along the longitudinal axis of the shaft 17, and thus the shafts 14 and 17 are described as being at right angles to each other.

The latch 22 has an extending portion 28 which extends toward the gear 18, and the latch has a tooth 29 of a width comparable to the spacings 21 of the gear 18, and FIG. 2 shows the tooth 29 disposed in a spacing 21 to thus be in the locked and restraining position relative to the gear 18. Therefore, the latch 22 is restraining the gear 18 against rotation, and, likewise, the shaft 17 cannot rotate, and thus the entire transmission of the vehicle is in the park-lock position and the vehicle cannot move.

It will of course be seen and understood that the latch 22 pivots or rotates about the axis of the shaft 14, but of course it generally moves with the rotation of the shaft 14, except to the extent of the lost motion provided by the arrangement of the pin 23 and the elongated slot 24. Therefore, the latch 22 moves in the direction axially of the gear 18, rather than radially thereto, in moving between the locked or engaged position of FIG. 2 and the free or disengaged position which would be when the latch 22 moves back, as viewed in FIG. 2 and the latch tooth 29 would then be clear of the gear teeth 19. Also, the latch 22 has a portion 31 which has a flat surface 32 extending contiguous with and adjacent to the tooth 29 to thereby provide an abutment portion and to contact or abut the far side of the gear 18 and thus fully and securely seat the latch tooth 29 in the spacing 21, as shown in FIG. 2.

To thus urge the latch 22 to the fully-seated position just described, a torsion spring 33 is piloted on the shaft 14, and one end 34 of the spring 33 is restricted by the stationary casing portion 27, and the other end 36 of the spring 33 extends into an opening 37 in the latch 22 to thus engage the latch 22 and urge the latch into the fully-seated position of FIG. 2, and FIG. 3 shows this arrangement with the spring end 36 urging the latch 22 in the clockwise direction, as viewed in FIG. 3, and this urging is to the extent that the latch abutment portion 31 engages the far side of the gear 18, as mentioned above, and the lost motion limit position permits engagement of portion 31. Thus the torsion spring 33 is wrapped in the direction to cause the spring end 36 to force against the latch surface 38 and thereby urge the latch 22 into the locked position shown.

FIGS. 1 and 2 thus show the lever 12 which is affixed with the shaft 14, and FIG. 1 shows the lever 12 has two arms 39 and 41 which are spaced apart and which are on opposite sides of a member 42 on the transmission case 10, and thus the lever arms 39 and 41 alternately can abut the member 42 and thereby limit the amount of pivot of the lever 12, but the limit is of course sufficient to induce rotation of the shaft 14 to an amount sufficient to have the latch 22 positioned between the engaging and disengaging positions described. Also, a tension spring 43 has one end connected to a pin 44 on an arm 46 of the lever 12, and the spring 43 has its other end 47 affixed to a stationary bracket 48 mounted on the transmission 10 in any suitable manner. Thus the spring 43 pulls upwardly on the pin 44 and therefore on the lever portion or arm 46 to hold the lever 12 in either the engaged or disengaged position, as desired. Also, the arrangement for positioning the spring ends 47 and 44, and the location of the axis 49 of the shaft 14 are such that the spring 43 can move from the over-center position as shown in FIG. 1, and that position would be the disengaged position for the latch 22, to the opposite over-center position, as shown by the dot-dash lines for the lever arm 46, and that position would be the park-lock position for the latch 22. Therefore, the spring 43 can be utilized for holding the lever 12 and therefore the shaft 14 in either set position, and in an over-center manner relative to the longitudinal axis of the shaft 14, to thereby assure that the control member, consisting of the rod 11 and the lever 12, is secured in either set position, at least to the extent of the urging of the spring 43.

The second sheet of drawings also shows that the latch tooth 29 is wedge-shaped or arranged with a lead-in end or surface 51, such that the end 51 is narrower than the overall thickness of the tooth 29, as seen in FIG. 2 and FIG. 4, and thus the tooth 29 can always enter the appropriate spacing 21 of the gear 18. That is, FIG. 4 shows an arrangement where the gear 18 may be stopped in a position such that its designated spacing 21 is not aligned with the latch tooth 29, and the leading end of the tooth 29 would simply abut the gear side or surface 52. However, upon slight motion of the gear 18, such as when the vehicle attempts to move, the tooth 29 would move into the spacing 21, and this movement would be by virtue of the configuration of the tooth 29 with the wedge shape described and shown and by the virtue of the urging of the torsion spring 33 which causes the tooth 29 to bear against the gear face or surface 52, without any further rotation of the shaft 14. That is, the lost motion connection 23 and 24 permits the urging of the torsion spring 23 until the abutment surface 32 contacts the gear 18, and thus the tooth will always enter the spacing 21 at the first need and opportunity.

Therefore, with this arrangement, the spring 33 is always urging the latch 22 toward the lock position, and the shaft 14 of course controls positioning of the latch 22, to the extent permitted by the lost motion connection of the pin 23 and the slot 24. Accordingly, all that is required in this mechanism is that there be the control member for rotating the shaft 14, and, for achieving the lock position, the spring 33 will then urge the latch 22 in the lock position, and there need not be any other mechanism for holding the latch 22 out of the lock position, when desired, nor need there be any further mechanism for achieving the lock position described.

What is claimed is:

1. A transmission park-lock mechanism comprising a rotatable transmission shaft, a gear mounted on said shaft for rotation therewith and including side portions and including peripheral teeth, an additional shaft rotatably mounted and at an angle relative to the axis of the first said shaft, a latch mounted on said additional shaft and to one side of said gear for movement in the plane transverse to the axis of said additional shaft and toward said gear for engagement with the teeth of said gear in response to rotation of said additional shaft for restraining said gear from rotating, said latch having a tooth adjacent to and facing said one side of said gear and an abutment portion remote from said gear, said abutment portion extending into abutment with said gear when said latch is engaged with the teeth of said gear, to thereby limit the movement of said latch toward said gear and align said latch tooth into engagement with said gear teeth, a spring engaged with said latch for yieldingly urging said latch into the engaged position with said gear teeth, a lost motion connection between said additional shaft and said latch and having a limit position for limiting the movement of said latch relative to said shaft and with said limit position being arranged to permit said latch abutment portion to move into contact with said gear, and a control member on said additional shaft for rotating the latter and thereby move said latch into and out of engagement with said gear.

2. The transmission park-lock mechanism as claimed in claim 1, wherein said lost motion connection is a pin and a slot connection, and said spring is a torsion spring piloted on said additional shaft.

3. The transmission park-lock mechanism as claimed in claim 2, including a stop operative on said control member for limiting the amount of rotation of said additional shaft.

4. The transmission park-lock mechanism as claimed in claim 1, wherein said latch tooth is narrowed on the side thereof opposite from said abutment portion and said side being that which commences engagement with said gear teeth, for assuring movement of said latch tooth between said gear teeth.

5. The transmission park-lock mechanism as claimed in claim 1, including an extendible spring connected to said control member for yieldingly urging said control member to the position of disengagement of said latch with said toothed gear.

6. The transmission park-lock mechanism as claimed in claim 5, wherein said control member includes a pivotally mounted piece, and a stop operative on said control member for limiting the amount of rotation of said additional shaft, and said extendible spring is connected to said pivotally mounted piece in an arrangement of an over-center connection, relative to the axis of pivot of said piece, for yieldingly retaining said piece in both its end limits of movement.

* * * * *